United States Patent [19]

Takahashi et al.

[11] Patent Number: 4,692,327

[45] Date of Patent: Sep. 8, 1987

[54] LAMINATED FILM FOR PACKAGING

[75] Inventors: Toru Takahashi; Taro Yoshida, both of Tokyo, Japan

[73] Assignee: Fujimori Kogyo Co., Inc., Tokyo, Japan

[21] Appl. No.: 772,685

[22] Filed: Sep. 5, 1985

[30] Foreign Application Priority Data

Sep. 6, 1984 [JP] Japan ................................ 59-186843
May 9, 1985 [JP] Japan .................................. 60-96680

[51] Int. Cl.$^4$ ............................................. B27N 5/02
[52] U.S. Cl. ..................................... 428/35; 428/458; 428/480; 428/483; 428/475.2; 525/425
[58] Field of Search .................. 428/458, 480, 483.35, 428/475.2; 525/425

[56] References Cited

U.S. PATENT DOCUMENTS 4,587,175 5/1986 Akao .................................. 428/220

Primary Examiner—Edith Buffalow
Attorney, Agent, or Firm—Birch, Stewart Kolasch & Birch

[57] ABSTRACT

A laminated film for packaging comprising an innermost layer and an outer layer laminated thereover which is suitable for the production of a container that may contain cosmetics and contents having flavoring ingredients while preserving the flavor thereof, wherein the innermost layer is formed with a polyester film obtained from a mixture of (1) a main resin component composed of a polyester resin with an average molecular weight of from 20,000 to 40,000 and (2) an auxiliary resin component selected from a polyamide and a polyester resin with an average molecular weight of from 5,000 to 20,000.

21 Claims, 2 Drawing Figures

LAMINATED FILM FOR PACKAGING

BACKGROUND OF THE INVENTION

This invention concerns a laminated film for packaging suitable in the production of flexible containers such as flexible pouches, laminate tubes, cups, cartons, composite cans, bag-in-boxes, etc. that contain contents such as cosmetics or contents having flavoring ingredients such as foodstuffs, soft drinks and cosmetics. More specifically, this invention relates to a laminated film, capable of being manufactured into a container of high heat seal strength and impact strength, which film preserves cosmetics and the flavoring ingredients of the contents by reducing adsorption, penetration and permeation of the cosmetics and flavoring ingredients into the container to a degree as low as possible.

Flexible containers for contents such as cosmetics and flavoring ingredients, such as various foodstuffs and soft drinks, have been widely used. An example is a packaging bag prepared from a composite film comprising a plurality of layers of plastic films which may include metal foil, such as laminated aluminum, by applying a heat seal to the circumferential side edge of the film in thereof the shape of a bag.

The packaging bag of this type generally utilized so far has an innermost layer usually made of a polyolefin such as polyethylene and polypropylene. However, the flavoring ingredients of the contents filled in the packaging bag are adsorbed to the polyolefin, and penetrate and permeate the polyolefin of the innermost layer. A metal foil such as aluminum foil may be inserted as an intermediate layer for preserving the flavoring ingredients, but delamination may possibly result, in which the flavoring ingredients penetrate as far as the surface of the metal foil to defoliate the polyolefin layer from the surface of the metal foil.

SUMMARY OF THE INVENTION

Accordingly, it is an object of this invention to provide a laminated film capable of effectively preventing cosmetics and flavoring ingredients of foodstuffs and soft drinks from adsorption and penetration of the innermost layer, and hence capable of serving effectively for the packaging of cosmetics and highly flavored foodstuffs and soft drinks.

Another object of this invention to provide a laminated film suitable for the production of a container of a large volume having a sufficient strength at heat sealed portions and a sufficient impact strength so as to exhibit improvement against breaking impact shock.

In order to attain the foregoing objects, the present inventors have made various studies of materials suitable for forming the innermost layer of the laminated film which is in contact with the contents. As a result, the inventors have found a useful film material obtained from a mixture of (1) a polyester resin with an average molecular weight (Mw) of from 20,000 to 40,000 prepared through multiphase polycondensation of an acid component containing at least one ingredient and an alcohol component containing at least one ingredient (the main resin component), and (2) an auxiliary resin component selected from a polyamide and a polyester resin with an average molecular weight of from 5,000 to 20,000 prepared through multiphase polycondensation of an acid component containing at least one ingredient and an alcohol component containing at least one ingredient.

We have further found that, by using the above-mentioned film material as the innermost layer for the laminated film, cosmetics and the flavoring ingredients contained in contents such as foodstuffs and soft drinks can be preserved well with no undesired adsorption and penetration. The laminated film incorporating this film material as the innermost layer can be used suitably as packaging material for flexible containers such as pouches, laminate tubes, cups, cartons, composite cans, bag-in-boxes, etc. which contain soft drinks containing D-limonen, decanal, etc.; candies containing vanillin, etc.; pharmaceutical troches or the like containing anethole, menthol, etc.; plasters containing menthol, etc.; and cosmetics containing benzaldehyde, citral, etc. Further, the impact strength of the thus obtained container is improved and the heat seal strength and breaking impact strength at sealed portions are improved as compared with those of a container solely composed of the main resin component. This invention has been accomplished based on the above-described findings.

Accordingly, this invention provides a laminated film for packaging which comprises an innermost layer and an outer layer laminated thereover, capable of containing cosmetics and contents having flavoring ingredients while preserving the flavor thereof with no escape, wherein the innermost layer comprises a polyester resin with an average molecular weight of from 20,000 to 40,000 as a main resin component and, mixed therewith, an auxiliary resin component selected from a polyamide and a polyester resin with an average molecular weight of from 5,000 to 20,000.

The above and other objects, features and advantages of the present invention will be more apparent from the following description.

DETAILED DESCRIPTION OF THE INVENTION

Figure 1:
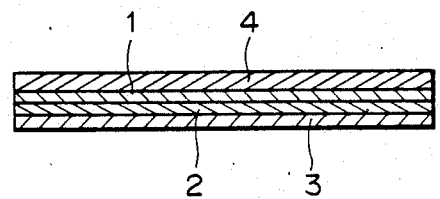
FIG. 1 and FIG. 2 are cross sectional views showing respective embodiments according to this invention.

The laminated film according to this invention comprises, when it is formed into a container, an innermost layer in contact with the contents and an outer layer laminated thereover.

According to this invention, the material used for constituting the innermost layer comprises a film obtained from a mixture of (1) a polyester resin with an average molecular weight of friom 20,000 to 40,000 prepared through multiphase polycondensation of an acid component containing at least one ingredient and an alcohol component containing at least one ingredient (the main resin component) and (2) an auxiliary resin component selected from a polyamide and a polyester resin with an average molecular weight of from 5,000 to 20,000 prepared though multiphase polycondensation of an acid component containing at least one ingredient and an alcohol component containing at least one ingredient.

The main resin component of the film used for forming the innermost layer of the laminated film according to this invention is a polyester resin with an average molecular weight of from 20,000 to 40,000, preferably, from 25,000 to 35,000 prepared through multiphase polycondensation of an acid component having at least one ingredient and an alcohol component having at least one ingredient. As the polyester resin, those aromatic dicarboxylic acid polyesters in which the acid ingredient comprises phthalic acid, terephthalic acid and isophthalic acid are preferred to polyesters with aliphatic dicarboxylic acid in view of their reduced adsorption, penetration and permeation of flavoring ingredients. Polyester resins that can be used herein effectively include, for example, polyesters such as polyethylene terephthalate; ternary polycondensated copolyesters obtained by polycondensating three ingredients, that is, two acid ingredients with one alcohol ingredient, such as terephthalic acid and isophthalic acid with ethylene glycol, terephthalic acid and isophthalic acid with 1,4-dicyclohexanedimethanol and terephthalic acid and isophthalic acid with propylene glycol; ternary polycondensated copolyesters obtained by polycondensating three ingredients, that is, one acid ingredient with two alcohol ingredients such as terephthalic acid with ethylene glycol and propylene glycol; and quarternary polycondensated copolyesters obtained by polycondensating four ingredients, that is, two acid ingredients with two alcohol ingredient, such as terephthalic acid and isophthalic acid with ethylene glycol and propylene glycol. Among them, polyethylene terephthalate and ternary polycondensated copolyesters such as derived from terephthalic acid and isophthalic acid with 1,4-butanediol are particularly preferred.

As an auxiliary resin component, the polyamide that is mixed with the above-mentioned polyesters may include nylon 6, nylon 66, nylon 8, nylon 10, nylon 11, nylon 12 and the copolymers thereof. Among them, the nylon 6 and nylon 6-nylon 66 copolymer are most preferred.

As another auxiliary resin component a polyester resin with a relatively low average molecular weight of from 5,000 to 20,000 is used. An aromatic dicarboxylic acid polyester resin in which an aromatic dicarboxylic acid is used as the acid component is more preferable than the polyester resin in which an aliphatic dicarboxylic acid is used as the acid component. Such a relative low molecular weight polyester resin with an average molecular weight of from 5,000 to 20,000 may include polyesters prepared by polycondensating one acid ingredient with one alcohol ingredient such as terephthalic acid with 1,4-butanediol; ternary polycondensated copolyesters prepared by polycondensating two acid ingredients with one alcohol ingredient such as terephthalic acid and isophthalic acid with 1,4-butanediol; or a quarternary polycondensated copolyester prepared by polycondensating four ingredients, that is, the two ingredients of terephthalic acid and isophthalic acid with the two ingredients of 1,4-butanediol and ethylene glycol. Among them, use of a copolycondensated polyester of terephthalic acid with 1,4-butanediol or a ternary polycondensated copolyester of phthalic acid and isophthalic acid with 1,4-butanediol is preferred.

In this case, the mixing ratio between the main resin component and the auxiliary resin component is desirably from 5 to 30 parts by weight and, particularly, from 10 to 20 parts by weight of the auxiliary resin component based on 100 parts by weight of the main resin component. If the auxiliary resin component is less than 5 parts by weight relative to 100 parts by weight of the main resin, the heat sealing property and the impact strength of the thus obtained film are reduced, although adsorption and permeation of the flavoring ingredients can be prevented. While on the other hand, if the mixing ratio of the auxiliary resin component exceeds 30 parts by weight, adsorption and permeation of the flavoring ingredients may be increased, and the film workability become poor to render the film less practical.

The film prepared by mixing the main resin component and the auxiliary resin component as described above is preferably used as a non-stretched film. The film thickness, while being properly selected depending on the size of the flexible container, kind and the amount of contents contained therein, etc., usually ranges from 10 to 150 $\mu$m and, preferably, from 20 to 80 $\mu$m.

The laminated film according to this invention uses a polyester film comprising the mixture of the main resin component and the auxiliary resin component as the innermost layer. In this case, other layers (e.g. the outer layer) of the laminated film are properly selected depending on need for the like of the flexible container and those known materials employed conventionally can be used therefor.

For example, the outer layer may be formed into a laminated structure by laminating a plastic film such as a polyethylene terephthalate film, a nylon film and polypropylene film, a sheet of paper, a metal foil such as aluminum, a plastic film vapor-deposited with aluminum or another metal, either separately or in combination of two or more of the above. While there are no particular restrictions, the thickness ranges from 10 to 200 $\mu$m and, preferably, from 12 to 80 $\mu$m.

The drawings show one embodiment of the laminated film according to this invention, wherein the laminated film shown in FIG. 1 is prepared by forming a polyolefin resin layer 2 on one surface of a metal foil 1 such as aluminum, directly or by way of adhesives, laminating a polyester film 3 according to this invention to the polyolefin resin layer 2 directly or by way of adhesives and laminating a surface layer 4 on the other side of the metal foil 1. In this case, the polyolefin resin layer that may be used is polyethylene, polypropylene or ethylenevinyl acetate copolymer. The surface layer 4 that may be used is a plastic film including polyethylene, polypropylene, polyester and nylon, a sheet of paper, and the like. The surface layer 4 is a single layer film selected for providing desired performance such as heat resistance, gas barrier property proofness, light screening property and rigidity, or a laminated film comprising plurality of such film layers laminated in an appropriate order.

Figure 2:
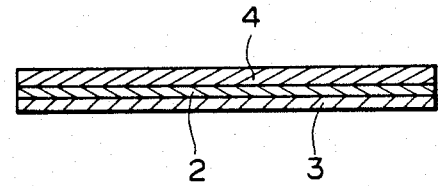

FIG. 2 shows an embodiment of the laminated film containing no metal foil.

When a laminated film is prepared by using various materials as described above, the polyester film prepared from a mixture of the main resin component and the auxiliary resin component may be formed as the innermost layer by means of a known method. For example, an extrusion coating method of extruding through a T-die or a dry lamination method of appending the polyester film by using appropriate adhesives, such as isocyanate adhesives, may be used solely or in combination.

In the case of preparing a flexible container such as a pouch by using the laminated film, the film is turned back, folded or overlaid upon itself such that the polyester resin film according to this invention forms the innermost layer, and then heat sealing is applied as required to the peripheral edges thereof to form a so-called three sided bag. Alternatively, a packaging material folded into an adverse V-shaped configuration is inserted as a bottom wall member into the lower end of a folded or overlaid laminated film as described above and heat sealing is applied over an appropriate shape and width for the required peripheral edges to form a self-sustaining packaging bag. Further, a so-called laminate-tube with the polyester film according to this invention situated as the innermost layer may be formed. Furthermore, other appropriate modes of containers may also be prepared.

The container produced by using the laminated film according to this invention prevents the flavoring ingredients of contents in a container from adsorption and penetration into the container as much as possible, and thus contains the contents while preserving the flavor without damaging the quality. The material according to this invention is excellent in its heat sealing performance with improved heat seal strength, and has a high impact strength so as to be resistant to breaking upon falling. Accordingly, it is suitable for the production of a container of a relatively large volume of 300 to 3000 ml.

This invention will now be described more specifically while referring to Examples and Comparative Examples. It should, however, be noted that this invention is no way limited to the Examples specified below.

EXAMPLES 1-6, COMPARATIVE EXAMPLE 1

Laminated films according to this invention were produced by using a polyester-polyamide mixed film (30μ thickness) as the innermost layer and laminating thereover, successively a polyethylene layer (50μ thickness) and aluminum foil (9μ thickness) and a biaxially oriented polyester film (12μ thickness). Further, for the comparison, a laminated film with the same structure as described above excepting that the innermost layer was made of a polyester film (60μ thickness) was prepared.

In the example of the present invention, the polyester used was a copolymerized copolyester having an average molecular weight ($\overline{Mw}$) of 30000 prepared by copolymerizing terephthalic acid, isophthalic acid and ethylene glycol in 10:1:11 by weight ratio, and the polyamide used was a nylon 6-nylon 66 copolymer prepared by copolymerizing nylon 6 and nylon 66 for the materials of Examples 1-3, and nylon 6 for the materials of Examples 4-6. The mixing ratio between the polyester and the polyamide is as shown in Table 1.

Then, three sided bags of 170 mm length and 130 mm width were prepared by using these materials. After filling 200 cc of water containing 0.1% D-limonen dissolved therein into the inside of the packaging bags, they were sealed and then left at 40° C. for 48 hours. Then, the amount of the limonen remaining in the aqueous limonen solution was examined by carrying out an adsorption test for the flavoring ingredient (D-limonen). The following symbols indicate the results in Table 1:

⊚ —a great amount of a residual limonen, indicating that limonen was scarcely adsorbed;

o—the amount of the residual limonen was slightly decreased indicating that there was some adsorption; and x—a small amount of residual limonen indicating that almost of the limonen was absorbed.

The heat seal strength was tested according to the heat seal strength test of JIS-Z-1526. Further, the impact strength test was carried out by gravitationally dropping a three sided bag of 15 cm length and 10 cm width which had been filled with 200 cc of water and sealed from a 1.2 m height and investigating the damages to the heat sealed portion. The following symbols indicate the results in Table 1:

⊚ —no damage recognized at all for the bag;

o—some damage recognized for the bag; and x—considerable damage recognized for the bag.

Furthermore, the workability for extruding the resin mixture of the main resin and the auxiliary resin through the T-die was investigated upon preparing the laminated films of the examples. The following symbols indicate the results in Table 1:

⊚ —excellent film forming property upon extrusion;

o—insufficient draw down property upon film formation through extrusion so as to show some breakage in the film (No problem on practice); and x—frequent breakage observed in the extruding film formation.

TABLE 1

| | | Mixing ratio (parts by weight) | | Limonen adsorption | Heat seal strength (kg/15mm) | Impact strength | Workability |
|---|---|---|---|---|---|---|---|
| | | Polyester | Polyamide | | | | |
| Example | 1 | 100 | 10 | ⊚ | 4.2 | ⊚ | ⊚ |
| | 2 | 100 | 20 | ⊚ | 4.6 | ⊚ | ⊚ |
| | 3 | 100 | 30 | o | 4.0 | ⊚ | o |
| | 4 | 100 | 10 | ⊚ | 3.5 | o | ⊚ |
| | 5 | 100 | 20 | ⊚ | 3.5 | o | ⊚ |
| | 6 | 100 | 30 | o | 2.5 | o | ⊚ |
| Comparative Example | 1 | 100 | — | ⊚ | 3.8 | x | o |

EXAMPLES 7-10, COMPARATIVE EXAMPLES 2 AND 3

Laminated films according to this invention were prepared by laminating a biaxially stretched polyester film of 12 μm thickness, an aluminum foil of 9 μm thickness, and a low density polyethylene film of 50 μm thickness successively for the outer layer by using isocyanate adhesives through a dry lamination method and, further, laminating thereto a mixed film of 60 μm thickness prepared by mixing the main resin (A) and the auxiliary resin (B) in the ratio as shown in Table 2 as the innermost layer (Examples 7-10).

Further, for the comparison, laminated films of the same structure as above excepting that the inner layer was a low density polyethylene film of 60 μm thickness and a polyester film of 60 μm thickness were prepared as Comparative Examples 2, 3.

In this case, a ternary polycondensated copolyester having an average molecular weight ($\overline{Mw}$) of 30000 from terephthalic acid, isophthalic acid and ethylene glycol in 10:1:11 weight ratio was used as the main resin (A) and a ternary copolycondensated polyester having an average molecular weight ($\overline{Mw}$) of 15000 from terephthalic acid, isophthalic acid and 1,4-butanediol in 1:1:2 by weight ratio was used as the auxiliary resin (B) for the polyester resin constituting the innermost layer. For the polyester films in the Comparative Examples, the same ternary copolycondensated polyester as in the main resin (A) was used.

Then, in the same procedures as in the foregoing examples, limonen adsorption, heat seal strength, impact strength and workability were estimated.

TABLE 2

|  | Mixing ratio (parts by weight) main resin (A): auxillary resin (B) | Limonen adsorption | Heat seal strength (kg/15 mm) | Impact Strength | Workability |
|---|---|---|---|---|---|
| Example 7 | 100:5 | ⊙ | 4.0 | ○ | ⊙ |
| 8 | 100:10 | ○ | 5.0 | ⊙ | ⊙ |
| 9 | 100:25 | ⊙ | 4.5 | ⊙ | ⊙ |
| 10 | 100:30 | ⊙ | 3.5 | ○ | ⊙ |
| Comparative 2 | low density polyethylene | x | 5.3 | ⊙ | ○ |
| Example 3 | polyester | ⊙ | 3.0 | x | ⊙ |

What is claimed is:

1. A laminated film for packaging which comprises an innermost layer and an outer layer laminated thereover, said innermost layer and said outer layer forming a laminated film that is suitable for the production of a container that is capable of containing cosmetics and contents having flavoring ingredients, wherein said innermost layer is formed with a polyester film obtained from a mixture of (1) a polyester resin with an average molecular weight of from 20,000 to 40,000 as a main resin component and (2) an auxiliary resin component selected from the group consisting of a polyamide and a polyester resin with an average molecular weight of from 5,000 to 20,000, whereby said innermost layer prevents adsorption and penetration of said cosmetics and said contents having flavoring ingredients into said laminated film, wherein the polyester film is obtained from a mixture of from 5 to 30 parts by weight of the auxiliary resin component and 100 parts by weight of the main resin component.

2. The laminated film as defined in claim 1, wherein the main resin component is prepared from an acid component and an alcohol component, and wherein said acid component is an aromatic dicarboxylic acid.

3. The laminated film as defined in claim 2, wherein the main resin component is polyethylene terephthalate or a ternary polycondensated copolyester derived from terephthalic acid, isophthalic acid and ethylene glycol.

4. The laminated film as defined in claim 1, wherein the polyamide is nylon 6, nylon 66 or a nylon 6-nylon 66 copolymer.

5. The laminated film as defined in claim 1, wherein the polyester resin with an average molecular weight of from 5,000 to 20,000 is prepared from an acid component and an alcohol component, and wherein said acid component is an aromatic dicarboxylic acid.

6. The laminated film as defined in claim 5, wherein the polyester resin with the average molecular weight of from 5,000 to 20,000 is a polycondensated copolyester derived from terephthalic acid and 1,4-butanediol, or a ternary polycondensated copolyester derived from terephthalic acid, isophthalic acid and 1,4-butanediol.

7. A laminated film as defined in claim 1, wherein the main resin component is derived from an acid component and an alcohol component and the polyester resin with an average molecular weight of from 5,000 to 20,000 is derived from an acid component and an alcohol component.

8. A laminated film as defined in claim 1, wherein the main resin component is a polyester resin with an average molecular weight of from 25,000 to 35,000.

9. A laminated film as defined in claim 2, wherein the acid component is phthalic acid, terephthalic acid or isophthalic acid.

10. A laminated film as defined in claim 1, wherein the main resin component is selected from the group consisting of polyethylene terephthalate; ternary polycondensated copolyesters obtained by polycondensating terephthalic acid and isophthalic acid with 1,4-butanediol, terephthalic acid and isophthalic acid with ethylene glycol, terephthalic acid and isophthalic acid, with 1,4-dicyclohexanedimethanol, terephthalic acid and isophthalic acid with propylene glycol, and terephthalic acid with ethylene glycol and propylene glycol; and quarternary polycondensated copolyesters obtained by polycondensating terephthalic acid and isophthalic acid with ethylene glycol and propylene glycol.

11. A laminated film as defined in claim 10, wherein the main resin component is polyethylene terephthalate or the ternary polycondensated copolyester obtained by polycondensating terephthalic acid and isophthalic acid with 1,4-butanediol.

12. A laminated film as defined in claim 1, wherein the polyamide is nylon 6, nylon 66, nylon 8, nylon 10, nylon 11, nylon 12 or copolymers thereof.

13. A laminated film as defined in claim 5, wherein the polyester resin with an average molecular weight of from 5,000 to 20,000 is selected from the group consisting of a copolyester prepared by polycondensating terephthalic acid with 1,4-butanediol; ternary polycondensated copolyesters prepared by polycondensating terephthalic acid and isophthalic acid with 1,4-butanediol, phthalic acid and isophthalic acid with 1,4-butanediol; and a quarternary polycondensated copolyester prepared by polycondensating terephthalic acid and isophthalic acid with 1,4-butanediol and ethylene glycol.

14. A laminated film as defined in claim 13, wherein the polyester resin with an average molecular weight of from 5,000 to 20,000 is the copolyester prepared by polycondensating terephthalic acid with 1,4-butanediol or the ternary copolyester prepared by polycondensating phthalic acid and isophthalic acid with 1,4-butanediol.

15. The laminated film as defined in claim 1, wherein the polyester film is obtained from a mixture of from 10 to 20 parts by weight of the auxiliary resin component and 100 parts by weight of the main resin component.

16. The laminated film as defined in claim 1, wherein the outer layer is selected from the group consisting of a plastic film, a polyethylene terephthalate film, a nylon film, a polypropylene film, a polyester film, a sheet of paper, a metal foil, aluminum foil, a plastic film vapor-deposited with a metal, a plastic film vapor-deposited with aluminum, and a combination of two or more of the above.

17. A laminated film as defined in claim 1, wherein the film thickness of the innermost layer is from 10 to 150 μm and the film thickness of the outer layer is from 10 to 200 μm.

18. A laminated film as defined in claim 17, wherein the film thickness of the innermost layer is from 20 to 80 μm and the film thickness of the outer layer is from 12 to 80 μm.

19. A laminated film as defined in claim 1, wherein the innermost layer is formed from a mixture of (1) a main resin component that comprises 100 parts by weight of a copolyester prepared by copolymerizing terephthalic acid, isophthalic acid and ethylene glycol and (2) an auxiliary resin component that comprises from 10 to 30 parts by weight of a polyamide selected from nylon 6 or a nylon 6-nylon 66 copolymer, and wherein the outer layer comprises, successively, a polyethylene layer, a metal foil layer, and a polyester film layer.

20. A laminated film as defined in claim 1, wherein the innermost layer is formed from a mixture of (1) a main resin component that comprises 100 parts by weight of a copolyester prepared by copolymerizing terephthalic acid, isophthalic acid and ethylene glycol and (2) an auxiliary resin component that comprises from 5 to 30 parts of a polyester resin with an average molecular weight of from 5,000 to 20,000 prepared from copolymerizing terephthalic acid, isophthalic acid and 1,4-butanediol and wherein the outer layer comprises, successively, a polyester film layer, a metal foil layer, and a polyethylene film layer which are adhered together by the use of adhesives.

21. A method for constructing a container which comprises laminating an outer layer over an innermost layer so as to form a laminated film and forming a container from said laminated film, wherein said innermost layer is formed with a polyester film obtained from a mixture of (1) a polyester resin with an average molecular weight of from 20,000 to 40,000 as a main resin component and (2) an auxiliary resin component selected from the group consisting of a polyamide and a polyester resin with an average molecular weight of from 5,000 to 20,000, whereby said innermost layer prevents adsorption and penetration into said laminated film of cosmetics and contents having flavoring ingredients which are contained in said container.

* * * * *